US008064894B1

(12) United States Patent
Bill

(10) Patent No.: US 8,064,894 B1
(45) Date of Patent: Nov. 22, 2011

(54) EXCHANGING DIGITAL CONTENT

(75) Inventor: David S. Bill, San Francisco, CA (US)

(73) Assignee: AOL Inc., Dulles, VA (US)

( * ) Notice: Subject to any disclaimer, the term of this patent is extended or adjusted under 35 U.S.C. 154(b) by 886 days.

(21) Appl. No.: 11/618,475

(22) Filed: Dec. 29, 2006

Related U.S. Application Data

(60) Provisional application No. 60/821,695, filed on Aug. 7, 2006.

(51) Int. Cl.
*H04M 11/00* (2006.01)

(52) U.S. Cl. ..... 455/418; 455/419; 455/403; 455/414.1; 370/395.3; 709/204; 709/217

(58) Field of Classification Search .................. 370/401; 709/204, 217, 225, 226; 455/420, 445, 405–409, 455/404.2, 414.1, 414.2, 414.3, 414.4, 415, 455/418, 422.1, 425, 433–453, 461, 456.1
See application file for complete search history.

(56) References Cited

U.S. PATENT DOCUMENTS

| | | | | |
|---|---|---|---|---|
| 6,859,807 | B1 | 2/2005 | Knight et al. | |
| 7,146,416 | B1 | 12/2006 | Yoo et al. | |
| 2003/0005035 | A1 | 1/2003 | Rodgers | |
| 2003/0033333 | A1 | 2/2003 | Nishino et al. | |
| 2003/0208485 | A1 | 11/2003 | Castellanos | |
| 2005/0033657 | A1 | 2/2005 | Herrington et al. | |
| 2006/0101003 | A1 | 5/2006 | Carson et al. | |
| 2006/0161635 | A1* | 7/2006 | Lamkin et al. | 709/217 |
| 2006/0167996 | A1* | 7/2006 | Orsolini et al. | 709/204 |
| 2006/0230021 | A1 | 10/2006 | Diab et al. | |
| 2006/0270395 | A1* | 11/2006 | Dhawan et al. | 455/418 |
| 2007/0083894 | A1 | 4/2007 | Gonsalves et al. | |
| 2007/0094247 | A1 | 4/2007 | Chowdhury | |

FOREIGN PATENT DOCUMENTS

WO WO 2007/047971 4/2007

OTHER PUBLICATIONS

Yahoo Buzz Index, http://web.archive.org/web/20040127191005/http://buzz.yahoo.com/, Jan. 27, 2004, 2 pages.
International Search Report and Written Opinion dated Jul. 3, 2008 for International Application No. PCT/US06/41117, 9 pages.
Office Action of U.S. Appl. No. 11/384,418, dated Jan. 5, 2009, 14 pages.
A. Spink and B. J. Jansen, A Study of Web Search Trends, Webology, vol. 1, No. 2, 9 pages, Dec. 2004, Nov. 23, 2005, cited at http//www.webology.ir/2004/v1n2/a4.html.

(Continued)

*Primary Examiner* — Nick Corsaro
*Assistant Examiner* — Chuong A Ngo
(74) *Attorney, Agent, or Firm* — Finnegan, Henderson, Farabow, Garrett & Dunner, LLP

(57) ABSTRACT

A first content selection stored on a portable media device is associated with a first tag. In addition, a second tag that is associated with a second content selection and that indicates that supplemental content related to the second content selection is stored on a peer device is accessed from a peer device. The first tag is compared to the second tag, and, if a commonality shared by the first content selection and the second content selection is identified, an exchange of the supplemental content from the peer device to the portable media device is initiated.

19 Claims, 10 Drawing Sheets

OTHER PUBLICATIONS

Ask Jeeves Unleashes More Smart Answers, Aug. 22, 2005, 5 pages, Jan. 23, 2005, cited at http//www.blog.searchenginewatch.com/blog/0508.
C. Aone, J. Gorlinsky, B. Larsen, and M. Okurowski, "Trainable Summarizer with Knowledge Acquired from Robust NLP Techniques", Advances in Automatic Text Summarization, MIT Press, Cambridge, MA, pp. 71-80, 1997.
D. Grossman and P. Frieder, "Information Retrieval Algorithm and Heuristics", Second Edition, Springer, Netherlands, 2004.
D. Marcu, "From local to global coherence: A bottom-up approach to text planning", American Association for Artificial Intelligence, pp. 627-635, 1997.
D. R. Radev and Weiguo Fan. Automatic Summarization of Search Engine Hit Lists, Hong Kong, 11 pages, Oct. 2000.
D. Radev, S. Blair-Goldensohn and S. Zhang, "Experiments in Single and Multi-Document Summarization Using MEAD", Proc. Document Understanding Conference, 8 pages, 2001.
D. Radev, S. Blair-Goldensohn, S. Zhang and R. Raghavan, "NewsInEssence: A System for Domain-Independent, Real-Time News Clustering and Multi-Document Summarization", Proceedings of the First International Conference on Human Language Technology Research (HLT '01), Association for Computational Linguistics, Morsistown, NJ, 4 pages, 2001.
E. Filatova and V. Hatzivassiloglou, "Event-Based Extractive Summarization",ACL Workshop on Summarization, Barcelona, Spain, 8 pages, 2004.
Google Zeitgeist, Search patterns, trends, and surprises according to Google, 2 pages, Nov. 23, 2005, cited at http://www.google.com/press/zeitgeist.html.
H. P. Edmundson, "New Methods in Automatic Extracting" Journal of the Association for Computing Machinery, vol. 16, No. 2, Apr. 1969, pp. 264-285.
H.P. Luhn, "The Automatic Creation of Literature Abstracts", pp. 159-165, IBM Journal Apr. 1958.
J. Carbonell and J. Goldstein, "The Use of MMR, Diversity-Based Reranking for Reordering Documents and Producing Summaries", Proceedings of the 21st Annual International ACM SIGIR Conference (SIGIR '98), Melbourne, Australia, pp. 335-336, 1998.
J. Goldstein, M. Kantrowitz, V. Mittal and J. Carbonell, Summarizing Text Documents: Sentence Selection and Evaluation Metrics, Special Interest Group on Information Retrieval (SIGIR '99), Berkley, CA, pp. 121-128, 1999.
K. Knight and D. Marcu, "Statistics-Based Summarization—Step One: Sentence Compression", American Association for Artificial Intelligence, 10 pages, 2000.
K. Knight and D. Marcu, "Summarization beyond sentence extraction: A probabilistic approach to sentence compression", Artificial Intelligence, pp. 91-107, 2001.
K. McKeown, R. Barzilay, J. Chen, D. Elson, D Evans, J. Klavans, A Nenkova, B. Schiffman and S. Sigelman, "Columbia's Newblaster: New Features and Future Directions", Proceedings of HLT-NAACL Demonstrations, pp. 15-16, 2003.
L. Vanderwende, M. Banko and A. Menezes, "Event-Centric Summary Generation", Proceedings of Document Understanding Conference at HLT-NAACL, Boston, MA, 6 pages, 2004.
M. Amini, "Interactive Learning for Text Summarization", Proceedings of the PKDD 2000 Workshop on Machine Learning and Textual Information Access, pp. 44-52, 2000.
M. Mitra, A. Singhal and C. Buckley, "Automatic Text Summarization by Paragraph Extraction", Proceedings of the ACL '97/EACL '97 Workshop on Intelligent Scalable Text Summarization, Madrid, Spain, pp. 1-11, 1997.
MSN Hot List, 2 pages, Nov. 23, 2005, cited at http://www.hotlist.msn.com.
Notice of Allowance dated Jun. 30, 2009 issued in U.S. Appl. No. 11/384,418, 14 pages.
Office Action issued in U.S. Appl. No. 11/384,418 dated Aug. 21, 2009, 12 pages.
R. Barzillay and M. Elhadad, "Using Lexical Chains for Text Summarization", In Proceedings of the Intelligent Scalable Text Summarization Workshop (ISTS '97), ACL, Madrid, Spain, pp. 10-17, 1997.
Rand Corporation, Hot Topics Selected Resources, Commentary, and Congressional Testimony, 2 pages, Nov. 23, 2005, cited at http//www.rad.org/hot_topics.
S. Chien and N. Immorlica, "Semantic Similarity Between Search Engine Queries Using Temporal Correlation", World Wide Web Conference, Chiba, Japan, pp. 2-11, 2005.
S. M. Beitzel, E. Jensin, A. Chowdhury and O. Freider, "Hourly Analysis of a Very Large Topically Categorized Web Query Log", Special Interest Group on Information Retrieval (SIGIR '04), Sheffield, South Yorkshire, UK, pp. 321-328, 2004.
S. M. Beitzel, E. Jensin, O. Freider, D.Lewis, A. Chowdhury and A. Kolcz. "Improving Automatic Query Classification via Semi-supervised Learning", Fifth IEEE International Conference on Data Mining (ICDM '05), 8 pages, 2005.
S. Outing, Poynteronline, Search Engine Rankings Point the Way, 5 pages, Nov. 23, 2005, cited at http://www.poynter.org/dg.lts/id.3785/content.content_view.htm.
S.E. Robertson, S. Walker and M. Beaulieu, "Experimentation as a way of life: Okapi at TREC", Information Processing and Management, 15 pages, 1999.
T. Briscoe and J. Carroll, "Robust Accurate Statistical Annotation of General Text", Proceedings of the Third International Conference on Language Resources and Evaluation (LREC 2002), 6 pages, 2002.
T. Strzalkowski, J. Wang and B. Wise, "A Robust Practical Text Summarization", Proceedings of the AAAI Intelligent Text Summarization Workshop, Stanford, CA, pp. 25-33, 1998.
U. Hahn and U. Reimer, "Knowledge-Based Text Summarization: Salience and Generalization Operators for Knowledge Base Abstraction", Advances in Automatic Text Summarization, MIT Press, pp. 215-232, 1997.
Variety.com, Get New and Reviews Delivered for Free, 3 pages, Nov. 23, 2005, cited at http://www.variety.com/index.asp?layout=rss.
W. Chuang and J. Yang, "Extracting Sentence Segments for Text Summarization: A Machine Learning Approach", Special Interest Group on Information Retrieval (SIGIR '00), pp. 152-159, 2000.
Yahoo News, Ratings Box: What's Hot/What's Not, 2 pages, Nov. 23, 2005, cited at http://www.news.yahoo.com/s/mediaweek/20051119/ad_bpimw/ratingsboxwhatshotwhatsnot.

* cited by examiner

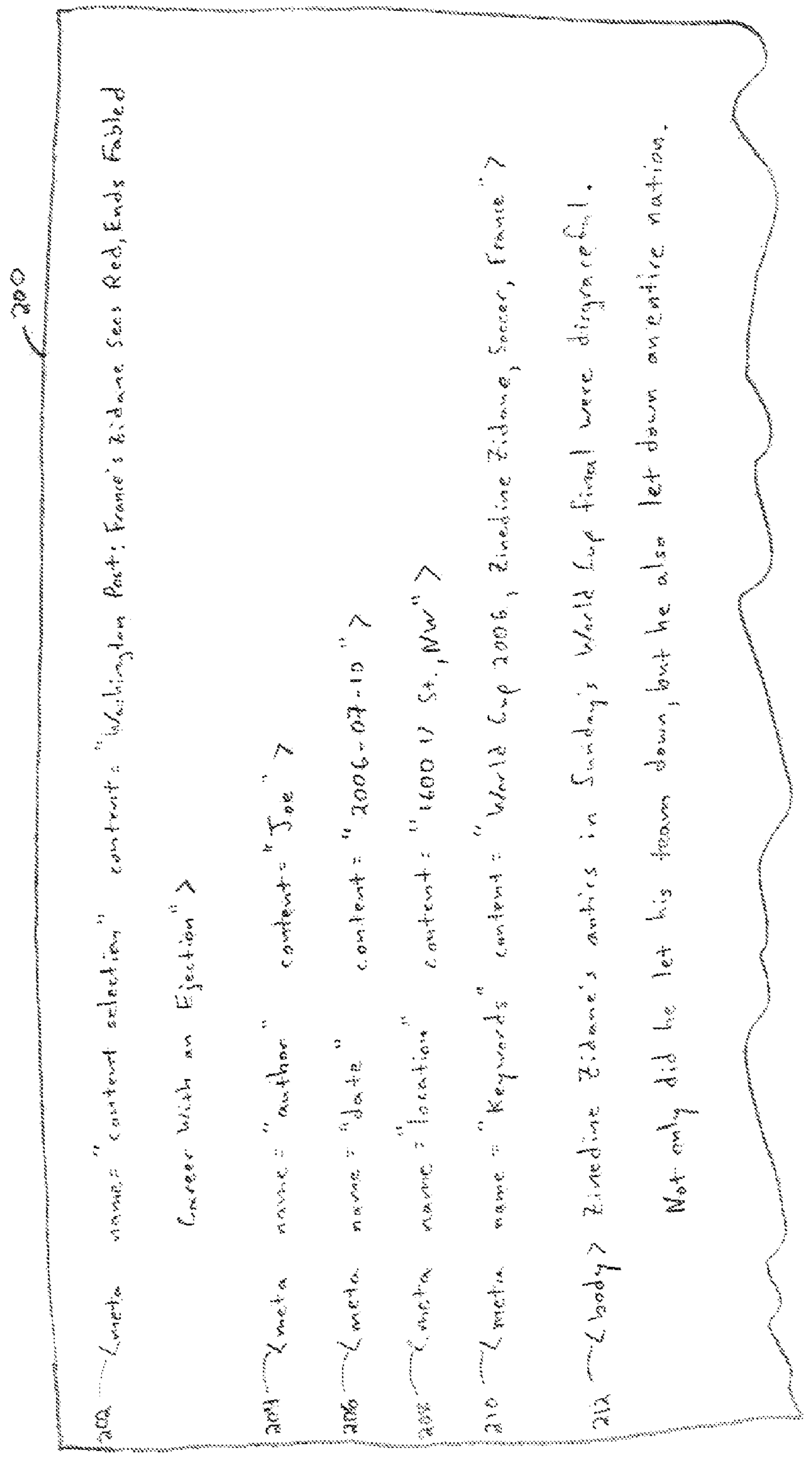

```
300

302 —<meta name="content selection"  content="Washington Post: France's Zidane Sees Red, Ends Fabled
              Career With an Ejection">

304 —<meta name="author"   content="Joe">

306 —<meta name="date"     content="2006-07-10">

308 —<meta name="location" content="1600 U St., NW">

310 —<meta name="keywords" content="World Cup 2006, Zinedine Zidane, Soccer, France">

312 —<body> Zinedine Zidane's antics in Sunday's World Cup final were disgraceful.
       Not only did he let his team down, but he also let down an entire nation.
```

250

252 <meta name="supplemental content" content="Zinedine Zidane's antics in Sunday's World Cup final were disgraceful. Not only did he let his team down, but he also let down an entire nation.">

254 <meta name="author" content="Joe">

256 <meta name="date" content="2006-07-10">

258 <meta name="location" content="1600 U St., NW">

260 <meta name="keywords" content="World Cup 2006, Zinedine Zidane, Soccer, France">

262 <body>

<P> France's Zidane Sees Red, Ends Fabled Career With an Ejection The Washington Post - Washington, D.C. </P>

<P> Author: Jason La Canfora - Washington Post Staff Writer </P>
<P> Date: Jul 10, 2006 </P>
<P> Start Page: E.1 </P>
<P> Section: SPORTS </P>
<P> Document Types: News </P>
<P> Text Word Count: 830 </P>
<P> Copyright The Washington Post Company Jul 10, 2006 </P>

<P> The dream ending to Zinedine Zidane's career was before him in extra time of the World Cup final. The French were pushing for a go- ahead goal in the 104th minute Sunday, when Zidane leaped from 12 yards out and slammed his head into the ball. Italian goalkeeper Gianluigi Buffon somehow flung his right hand in the ball's path, however, and from that point, the final night of Zidane's era of greatness went from disappointment to ignominy. </P>

FIG. 2b

EXCHANGING DIGITAL CONTENT

CROSS-REFERENCE TO RELATED APPLICATION

The present application claims priority from U.S. Provisional Patent Application No. 60/821,695 filed Aug. 7, 2006, and titled "Exchanging Digital Content," the entire contents of which is incorporated herein by reference for all purposes.

TECHNICAL FIELD

This disclosure relates to exchanging digital content.

BACKGROUND

Portable media devices enable users to generate, manipulate, receive, transmit, store, access, and/or display (e.g., render, play, or otherwise make perceivable to a user) digital content portably. That is to say, portable media devices enable users to take digital content (e.g., songs, videos, news stories, books, web pages, documents, or photographs) with them as they travel through the day. Examples of such portable media devices include, a laptop computer, a mobile telephone, a personal digital assistant (PDA), a portable music player (e.g., a ZEN® portable media center), a portable media player, or a portable messaging device (e.g., a Blackberry® or a Palm® Treo).

SUMMARY

In one aspect, a news article is maintained on a portable media device and a communication from a peer device is received at the portable media device. In response to a determination, based on the communication received from the peer device, that the peer device has supplemental content related to the news article, the supplemental content is received from the peer device. In addition, perception of the received supplemental content is enabled.

Implementations may include one or more of the following features. For example, one or more tags may be received from the peer device that include a first indication indicating that the peer device has the supplemental content related to the news article and a second indication indicating a location associated with the peer device. In addition, the received supplemental content may be stored at the portable media device and the stored supplemental content may be associated with a third indication indicating the location associated with the peer device.

In another aspect, a first tag may be associated with a particular content selection from among a group of content selections and a second tag may be received from a peer device. Thereafter, a determination as to whether the peer device has supplemental content related to the particular content selection is made based on the received second tag. In response to a determination that the peer device has supplemental content related to the particular content selection, supplemental content is received from the peer device and perception of the received supplemental content, in association with the particular content selection, is enabled.

Implementations may include one or more of the following features. For example, the first tag may include an indication that identifies the particular content selection and the second tag may include an indication that the peer device has supplemental content related to the particular content selection. Furthermore, a third tag may be received from the peer device that includes an indication of a location associated with the peer device. In addition, a determination may be made as to whether the location associated with the peer device is within a predetermined distance from a device of the user and the supplemental content may be received from the peer device based on a determination that the location associated with the peer device is within the predetermined distance from the device of the user in addition to a determination that the peer device has supplemental content related to the particular content selection.

In some implementations, the first tag may be transmitted to the peer device and the second tag may be received from the peer device in response to transmitting the first tag to the peer device. Furthermore, the second tag and/or the supplemental content may be received over a wireless connection.

The group of content selections may be image files, video files, audio files, text files, web pages, or electronic documents. In addition, the supplemental content may be a rating of the particular content selection, an indication of a preference for the particular content selection, a discussion of the particular content selection, or a weblog entry. Furthermore, the peer device may be a portable media device, a personal digital assistant, a portable computer, a mobile telephone, or a digital media player.

In some implementations, additional supplemental content may be transmitted from the portable media device to the peer device in response to receiving the second tag from the peer device. Additionally or alternatively, the peer device may be interrogated to determine whether the peer device has supplemental content related to the particular content selection. In such implementations, the second tag may be received in response to interrogating the peer device.

Determining whether the peer device has supplemental content related to the particular content selection may include comparing the received second tag to the first tag, and determining that the first tag and the received second tag correspond to the same content selection.

Supplemental content may be requested from the peer device and the supplemental content may be received in response to the request. In some implementations, a user may be informed that the peer device has supplemental content related to the particular content selection and the supplemental content may be received in response to receiving an instruction as input from the user to acquire the supplemental content related to the particular content selection from the peer device.

In another aspect, a first content selection stored on a portable media device is associated with a first tag. In addition, a second tag that is associated with a second content selection and that indicates that supplemental content related to the second content selection is stored on a peer device is accessed from a peer device. The first tag is compared to the second tag, and, if a commonality shared by the first content selection and the second content selection is identified, an exchange of the supplemental content from the peer device to the portable media device is initiated.

Implementations of any of the techniques described may include a method or process, an apparatus or system, or computer software on a computer-accessible medium. The details of one or more implementations are set forth in the accompanying drawings and the description below.

DESCRIPTION OF DRAWINGS

FIG. 2*a* is an illustration of a supplemental content entry that includes metadata tags for associating the supplemental content entry with a particular content selection.

FIG. 2*b* is an illustration of a particular content selection with metadata tags that include supplemental content associated with the particular content selection.

DETAILED DESCRIPTION

Figure 1A:
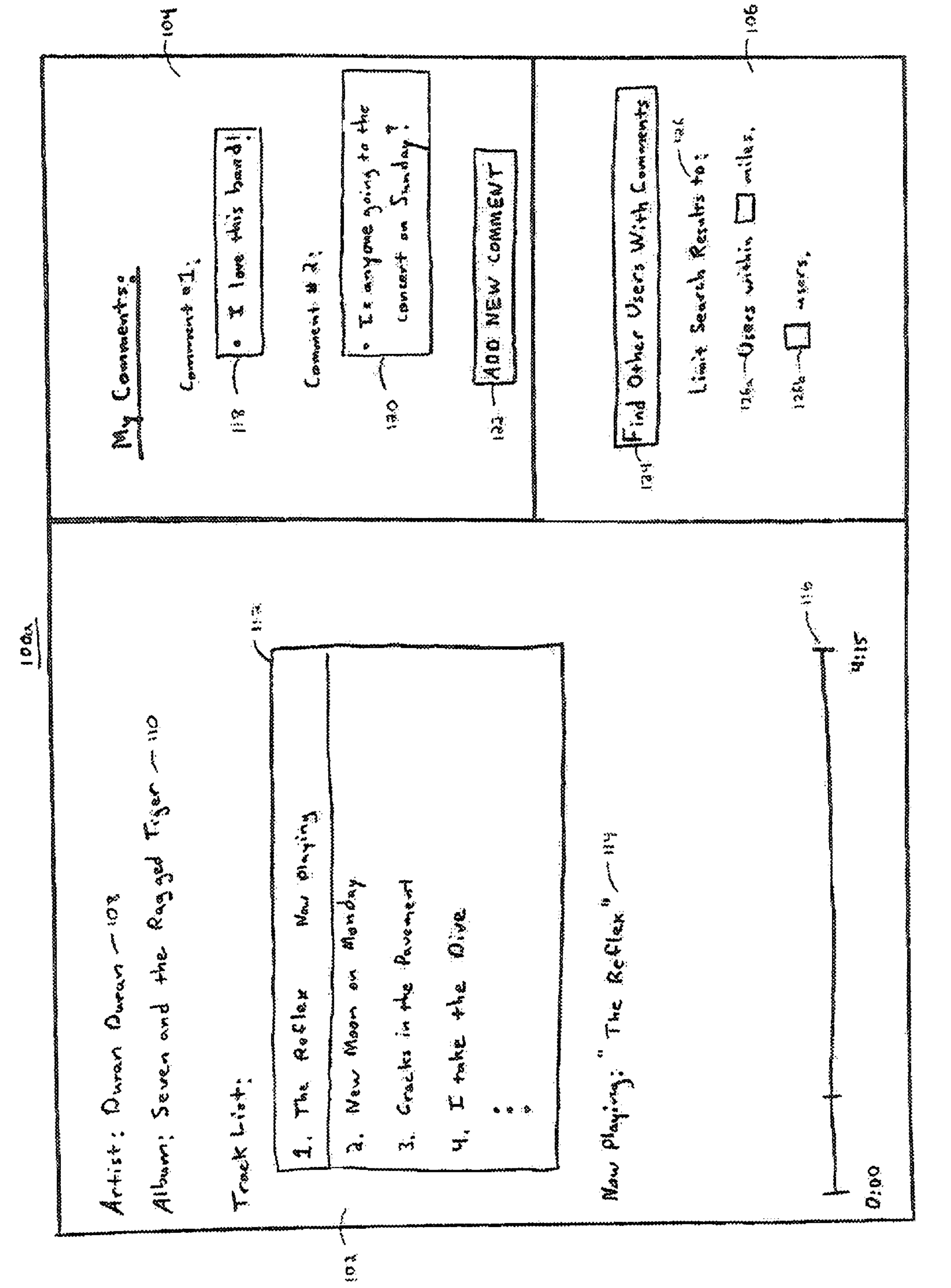
FIGS. 1*a*-1*c* are examples of a graphical user interface for enabling the display and exchange of digital content on a portable media device.

A portable media device enables a user to associate supplemental content with a particular content selection stored on the portable media device. For example, the portable media device may enable the user to create one or more responses, as supplemental content, to a Washington Post article or a popular song that is stored on the portable media device. Examples of supplemental content therefore may include these responses, a rating of the particular content selection, an indication of a preference for the particular content selection, or a discussion of the particular content selection. The supplemental content may be created and stored in a wide variety of different formats such as, for example, a text format, an audio format, a video format, or an audio-visual format.

Enabling a user to create and associate supplemental content with a particular content selection that is stored on the portable media device may create a different and more personalized interaction with what otherwise may represent mass distributed content. More precisely, enabling a user to create, and store supplemental content associated with a content selection stored on the user's portable media device may facilitate the creation of a personal journal or weblog (blog) of commentary or discussion related to the content selection. For example, the user may associate numerous supplemental content entries over time with a particular content selection reflecting how the user's opinion of the content selection has evolved with time.

To enhance the use of supplemental content that a user has associated with a particular content selection, the portable media device may communicate with other portable media devices that also maintain supplemental content associated with the particular content selection to facilitate the exchange of the supplemental content with the other portable media devices. By facilitating the exchange of supplemental content related to a particular content selection with other portable media devices that also have supplemental content related to the particular content selection, the portable media device enables the user to participate in a richer, more interactive experience. For example, by automatically locating and acquiring supplemental content related to a particular content selection, the portable media device may enable a user of the portable media device to identify one or more other users with similar or conflicting interests, opinions, values, etc. The ability to automatically locate and acquire supplemental content related to a particular content selection may be particularly useful in situations where the content selection to which the supplemental content is related is relatively obscure or unpopular. Furthermore, by linking the user of the portable media device to other users of other portable media devices that maintain supplemental content associated with the same content selection (e.g., based on the relatedness of the user to the other users, demographically, by information and interests inferred or revealed by their profiles or communications or selections, or by their selection or expressed knowledge of each other for this or other purposes), the portable media device may provide the user with access to a greater breadth and diversity of information and opinion relevant to the particular content selection than to which would otherwise be available to the user.

In one example, a user may store news items on the user's portable media device. After reading a Washington Post article on the portable media device, the user may write a response to the article. Subsequently, the portable media device may communicate with one or more other portable media devices to determine whether any other portable media devices have supplemental content associated with the same Washington Post article. For example, as the user walks from the user's office to the Metro station, the user's portable media device may interrogate other portable or non-portable media devices in the portable media device's vicinity (e.g., portable media devices carried by passersby as the user walks from the user's office to the Metro station or computer and computer networks proximate or otherwise accessible to the user's portable media device) to determine whether any of the devices have supplemental content related to the same Washington Post article. In the event that the portable media device identifies another portable media device that has supplemental information about the same Washington Post article, the portable media device may alert the user to the discovery and enable the user to exchange supplemental content with the other portable media device having supplemental information related to the Washington Post article. For instance, the portable media device may enable the user to acquire the supplemental content about the Washington Post article from the other portable media device. Additionally or alternatively, the portable media device may enable the user to transmit the user's response to the Washington Post article to the other portable media device.

When a user of a portable media device creates supplemental content related to a particular content selection, an identifier may be generated in order to logically associate the supplemental content with the particular content selection to which it is related. In some implementations, the user may affirmatively create the logical association between the supplemental content and the content selection by instructing the portable media device to record the relationship. Alternatively, the portable media device may analyze a content selection with a dictionary of keywords in order to generate a metadata tag, or similar identifier, for the content selection.

In other implementations, the user's act of generating supplemental content may inspire the portable media device to identify and record the relationship between the supplemental content and a particular content selection automatically. For example, if a user creates supplemental content at the same time as, or a short time after, perceiving a particular content selection (e.g., listening to a song, watching a video, reading a news story, listening to and/or reading a book, or viewing a photograph), the portable media device may determine that the supplemental content is to be associated with the recently perceived content selection. Consequently, the portable media device automatically may generate an identifier that records the association between the supplemental content and the particular content selection. Additionally or alternatively, the portable media device may analyze recently-created supplemental content in an attempt to identify a particular content selection stored on the portable media device with which to associate the supplemental content. For example, the portable media device may parse a supplemental content entry for certain keywords in order to determine a content selection with which to associate the supplemental content.

In addition to recording the association between the supplemental content and the content selection with which the supplemental content is related, the identifier also may include geographic information that identifies the location of the portable media device. In some implementations, the geographic information may be updated dynamically as the location of the portable media device changes. For example, the portable media device may include a global positioning system (GPS) receiver that enables the portable media device to determine its position and update the geographic information accordingly. Additionally or alternatively, the portable media device may communicate over a wireless network and update the geographic information based on the different base stations with which the portable media device communicates. In other implementations, the geographic information may not be updated dynamically.

A portable media device that maintains supplemental content related to a particular content selection may attempt to locate other portable media devices that have supplemental content related to the same content selection by exchanging an identifier in which the association between the supplemental content and the content selection is stored with other portable media devices. For example, the portable media device may broadcast the identifier to other portable media devices. When a peer device that maintains supplemental content related to the same content selection receives the broadcasted identifier, the peer device may respond to the portable media device and identify itself as a device that has supplemental content related to the same content selection.

Figure 1B:
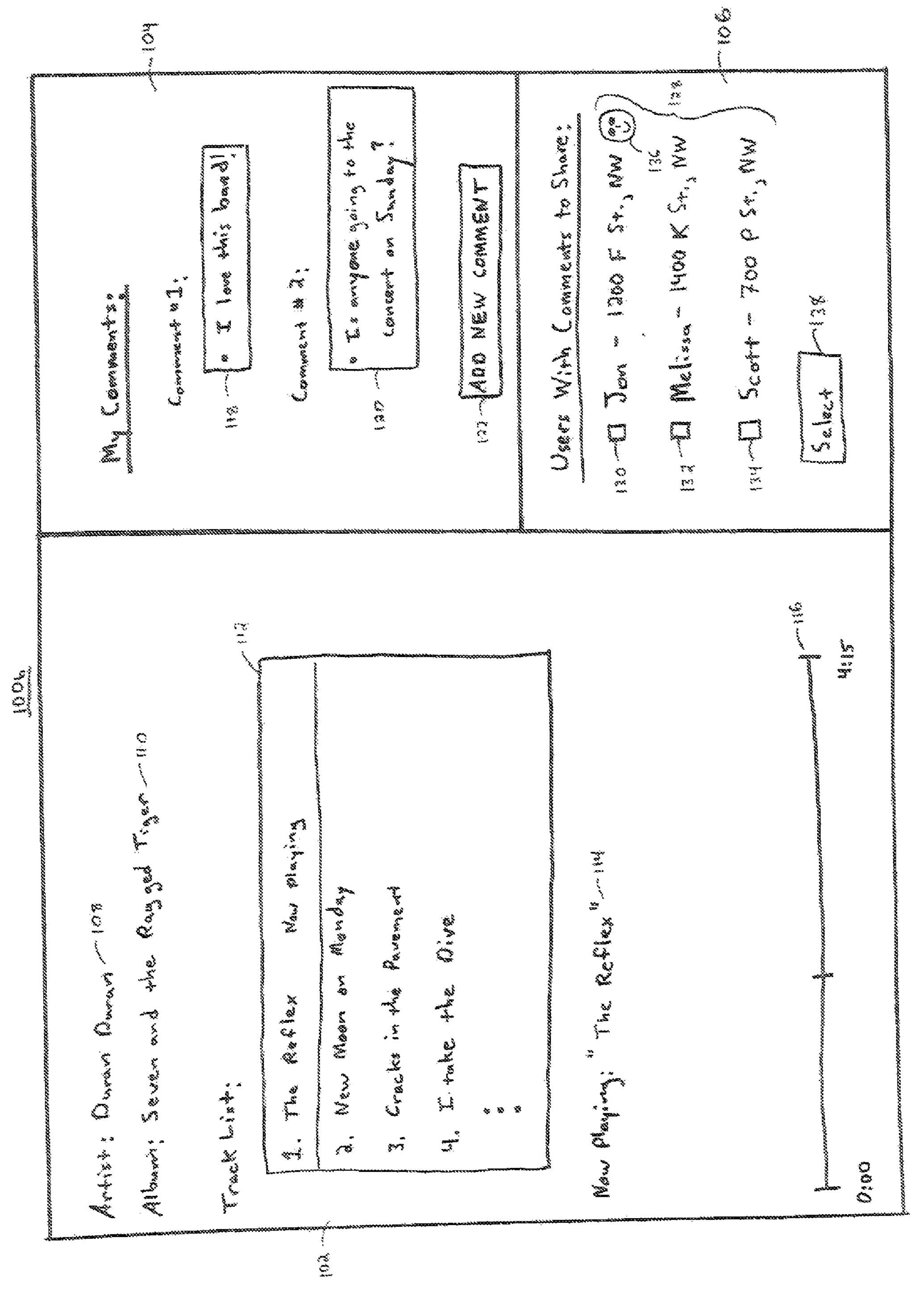
Figure 1C:
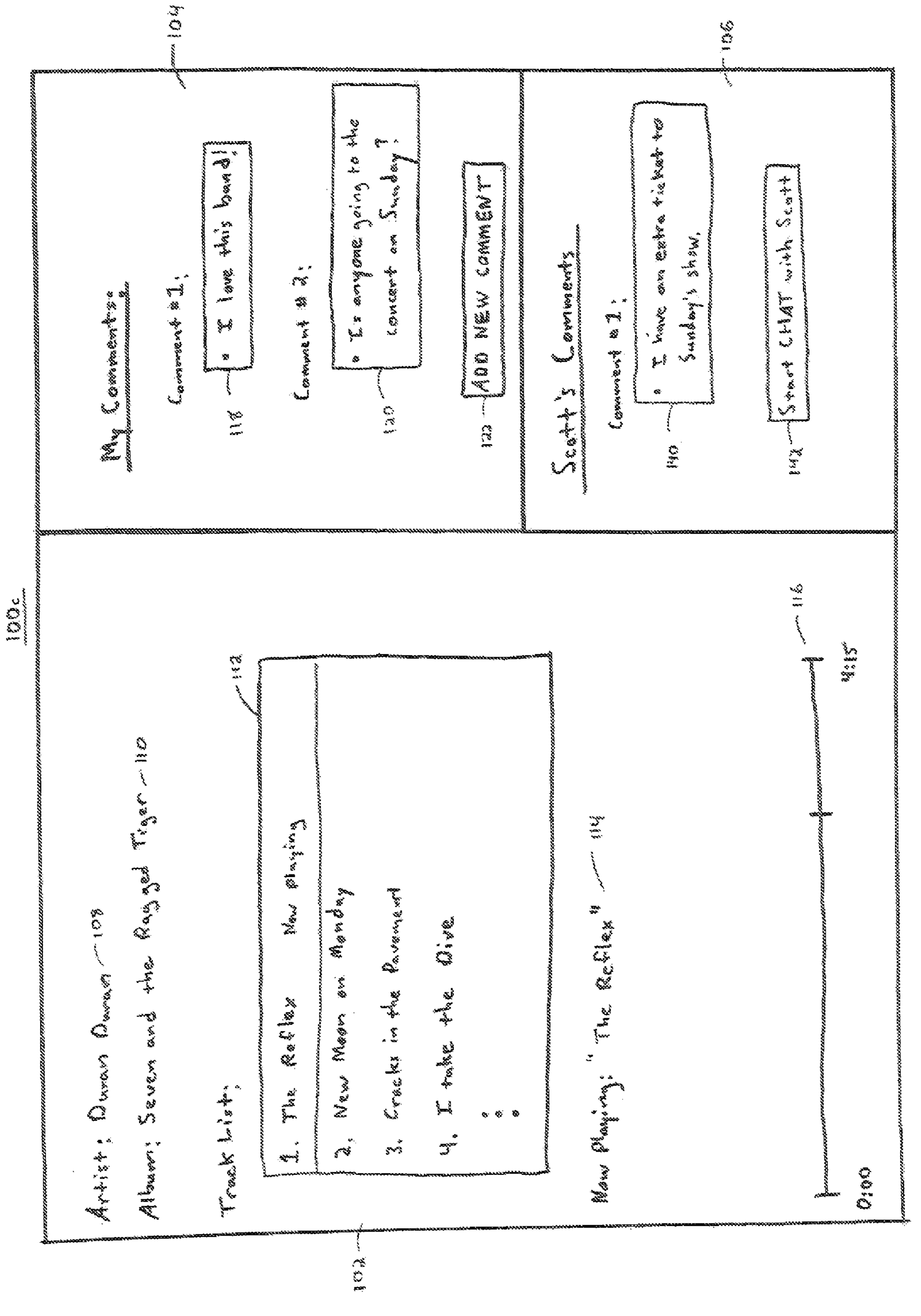

FIGS. 1*a*-1*c* are examples of graphical user interfaces (GUIs) 100*a*, 100*b*, and 100*c* for enabling the display and exchange of digital content on a portable media device. More particularly, GUIs 100*a*, 100*b*, and 100*c* may be rendered on a portable media device to enable a user of the portable media device to play songs stored on the portable media device and to perceive and exchange supplemental content associated with the songs being played.

GUI 100*a* of FIG. 1*a* includes a "Now Playing" left panel 102, a "My Supplemental Content" upper right panel 104, and an "Other Users' Supplemental Content" lower right panel 106. "Now Playing" panel 102 displays information about the content selection currently being rendered on the portable media device. For example, "Now Playing" panel 102 includes an artist name field 108, an album name field 110, and a track listing 112 that identify the album currently being played, the band that recorded the album, and the songs recorded on the album. In addition, "Now Playing" panel 102 includes a now playing field 114 identifying the song currently being played and a progress bar 116 that indicates the user's current location within the song.

The "My Supplemental Content Panel" 104 displays supplemental content created by the user that is related to the album currently being played on the portable media device and allows the user to create additional supplemental content related to the album being played. In particular, right panel 104 includes supplemental content created by the user, such as first comment 118 and second comment 120. In addition, "My Supplemental Content Panel" 104 includes an "Add New Comment" button 122 that enables the user to create additional supplemental content associated with the album currently being played by activating the "Add New Comment" button 122.

When a user activates the "Add New Comment" button 122, another GUI may be rendered that enables the user to input supplemental content such as, for example, an opinion regarding the album currently being played, a preference for the album currently being played, or any other comment related to the album being played. In one example, the portable media device may enable the user to record supplemental content using a microphone or a microphone and video camera combination on the portable media device. In another example, the portable media device may enable the user to enter commentary using a keyboard on the portable media device.

In some implementations, the portable media device enables a user of the portable media device to generate supplemental content associated with a particular content selection even if the particular content is not being displayed or otherwise being made perceivable. In such cases, the portable media device may enable the user to affirmatively instruct the portable media device to associate the supplemental content with a particular content selection. Alternatively, the user's act of creating the supplemental content alone may generate an association with a particular content selection automatically. For example, when a user inputs supplemental content a short time period after perceiving a particular content selection, the portable media device may determine that the supplemental content is intended to be associated with the content selection. Therefore, the portable media device may record the association automatically. Additionally or alternatively, the portable media device may analyze a newly input supplemental content entry in an attempt to determine a content selection with which to associate the supplemental content. For example, the portable media device may parse a newly-entered supplemental content entry for certain keywords in order to determine a content selection with which to associate the supplemental content.

The "Other Users' Supplemental Content" panel 106 enables a user to locate other users and/or peer devices that have supplemental content that is related to the album currently being played on the portable media device. In particular, the "Other Users' Supplemental Content" panel 106 includes a "Find Other Users With Comments" button 124. The "Find Other Users with Comments" button 124 enables a user to search for and identify other users and/or peer devices that also have supplemental content that is related to the album currently being played by activating the "Find Other Users with Comments" button 124. In addition, the other users' supplemental content panel 106 includes a limit search results field 126 that enables the user to limit the search results returned in response to an activation of the "Find Other Users With Comments" button 124. More specifically, the limit search results field 126 includes a limit search results distance sub-field 126*a* and a limit search results user sub-field 126*b*. By manipulating the limit search results distance sub-field 126*a* and the limit search results user sub-field 126*b*, the user of the portable media device can limit the search results returned in response to an activation of the "Find Other Users With Comments" button 124 to users and/or peer devices that are within a specified distance of the user and/or to a maximum number of users and/or peer devices.

FIG. 1*b* is an example of a GUI 100*b* displayed in response to activation of the "Find Other Users With Comments" button 124 of GUI 100*a* of FIG. 1*a*. In response to the activation of the "Find Other Users with Comments" button 124 of FIG. 1*a*, the portable media device searches for and identifies other users and/or peer devices that have supplemental content related to the album currently being played. After other users and/or peer devices that have supplemental content related to the album currently being played are identified, a list 128 of other users and/or peer devices that have supplemental content related to the album currently being played is presented in the "Other Users' Supplemental Content" panel 106.

In particular, the list 128 of other users and/or peer devices that have supplemental content related to the album currently being played includes an entry 130 indicating that Jon's peer device has supplemental content related to the album currently being played, an entry 132 indicating that Melissa's peer device has supplemental content related to the album currently being played, and an entry 134 indicating that Scott's peer device has supplemental content related to the album currently being played.

In addition to identifying other users and/or peer devices that have supplemental content related to the album currently being played, the list 128 identifies the location of each user and/or peer device identified as having-supplemental content related to the album currently being played. For example, entry 130 indicates that Jon's peer device is currently located on the 1200 block of F Street, NW in Washington, D.C., entry 132 indicates that Melissa's peer device is currently located on the 1400 block of K Street, NW in Washington, D.C., and entry 134 indicates that Scott's peer device is currently located on the 700 block of P Street, NW in Washington, D.C.

List 128 also includes an icon 136 displayed beside entry 130 indicating that Jon is a favorite user of the user of the portable media device. For example, Jon may be listed as an entity in the user's list of co-users (e.g., the user's AIM® Buddy List) maintained on the portable media device. Additionally or alternatively, the user may maintain contact information for Jon in a contacts list or address book stored on the portable media device, or the user may have stored some other indication on the portable media device identifying Jon as a known or preferred user. In some implementations, the portable media device may enable the user to add other users identified in list 128 to a preferred list of co-users stored on the portable media device.

"Other Users' Supplemental Content" panel 106 also includes a "Select" button 138. By selecting one of the users and/or peer devices identified in list 128 and then activating "Select" button 138, the user may instruct the portable media device to acquire the supplemental content associated with the album currently being played from one of the users and/or peer devices identified in the list 128. For example, the user may select entry 134 from the list 128 and then activate the "Select" button 138 in order to instruct the portable media device to acquire the supplemental content from Scott's peer device.

FIG. 1*c* is an example of a GUI 100*c* displayed after selection of entry 134 from list 128 and activation of the "Select" button 138 of GUI 100*b* of FIG. 1*b*. In response to receiving the user's instruction to acquire the supplemental content from Scott's peer device, the "Other Users' Supplemental Content" panel 106 now presents Scott's supplemental content associated with the album currently being played. In particular, the other users' supplemental content panel 106 includes a comment 140 that the portable media device acquired from Scott's peer device. In addition, the "Other Users' Supplemental Content" panel 106 includes a "Start Chat" button 142 that enables the user of the portable media device to initiate a real-time or pseudo real-time electronic chat or discussion with Scott. For example, if the user is interested in purchasing Scott's extra ticket, the user may be interested in initiating a chat with Scott in order to negotiate a purchase price for the ticket. Selecting "Start Chat" button 142 may launch an instant messaging or similar chat program that enables the user to communicate with Scott in real-time or pseudo real-time.

The GUIs 100*a*, 100*b*, and 100*c* presented in FIGS. 1*a*-1*c* are merely examples of GUIs for enabling the display and exchange of digital content on a portable media device. Other configurations and implementations are contemplated. For example, other GUIs may enable the user to perceive other formats of digital content such as, for example, a video, a news story, a book, a web page, a document, or a photograph. Additionally or alternatively, other GUIs may enable the user to acquire and/or exchange supplemental content related to one or more particular content selections stored on the portable media device even if the portable media device is not currently rendering the one or more particular content selections.

A variety of different mechanisms may be used to associate supplemental content with a particular content selection stored on a portable media device. For example, when a user generates a supplemental content entry associated with a particular content selection, one or more metadata tags may be associated with, embedded within, or otherwise linked to the supplemental content entry so as to associate the supplemental content entry with the particular content selection. Additionally or alternatively, when a user generates a supplemental content entry associated with a particular content selection, one or more metadata tags may be associated with, embedded within, or otherwise linked to the particular content selection so as to associate the supplemental content entry with the particular content selection.

FIG. 2*a* is an illustration of a supplemental content entry 200 that includes metadata tags for associating the supplemental content entry 200 with a particular content selection. In particular, the supplemental content entry 200 includes a content selection metadata tag 202 that indicates that the supplemental content entry 200 is associated with the Washington Post article "France's Zidane Sees Red, Ends Fabled Career With an Ejection." In addition, the supplemental content entry 200 includes an author metadata tag 204 identifying Joe as the author of the supplemental content entry 200, a date metadata tag 206 identifying Jul. 10, 2006 as the date on which the supplemental content entry 200 was created, a location metadata tag 208 identifying the 1600 block of U Street, NW in Washington, D.C. as a location associated with a portable media device on which the supplemental content entry 300 is stored, and a keywords metadata tag 210 identifying keywords associated with the supplemental content entry 200 and/or the particular content selection with which the supplemental content entry 200 is associated. The supplemental content entry 200 also has a body 212 that includes the actual content of the supplemental content entry 200.

FIG. 2*b* is an illustration of a particular content selection 250 having metadata tags that include supplemental content associated with the particular content selection 250. In particular, a supplemental content metadata tag 252 including a supplemental content entry has been embedded in the particular content selection 250. In addition, an author metadata tag 254 identifying Joe as the author of the supplemental content entry, a date metadata tag 256 identifying Jul. 10, 2006 as the date on which the supplemental content entry was created, a location metadata tag 258 identifying the 1600 block of U Street, NW in Washington, D.C. as a location associated with a portable media device on which the particular content selection 250 is stored, and a keywords metadata tag 260 identifying keywords associated with the supplemental content entry and/or the particular content selection 250 are also embedded within the particular content selection. The particular content selection 250 also includes a body 262 that includes the actual content of the particular content selection 250.

Other mechanisms also may be used to record and/or store an association between a supplemental content entry and a particular content selection. For example, a single metadata tag may be embedded within a particular content selection to record a variety of metadata associated with the particular content selection as well as the existence of a supplemental content entry associated with the particular content selection. The information stored within the single metadata tag may include, for example, an indication of a title or name of the particular content selection, data that is descriptive of the particular content selection, a personal opinion or response to the particular content selection, an indication of a preference for the particular content selection, keywords that are related to the particular content selection, an indication of a location associated with the portable media device on which the particular content selection is stored, and/or an indication of whether supplemental content associated with the particular content entry exists. For the purposes of illustration, an example of a single metadata tag including information related to the album "Seven and the Ragged Tiger" by Duran Duran may take the form:

<Selection=Duran Duran, "Seven and the Ragged Tiger";
Selection Description=1980s music;
Keywords=British new wave, synthesizer;
Preference=Like;
Supplemental Content Exists=True;
Location=Washington, D.C.>

In this example, setting the "supplemental content exists" attribute to true indicates that a supplemental content entry that is associated with the album exists on the portable media device.

Figure 3A:
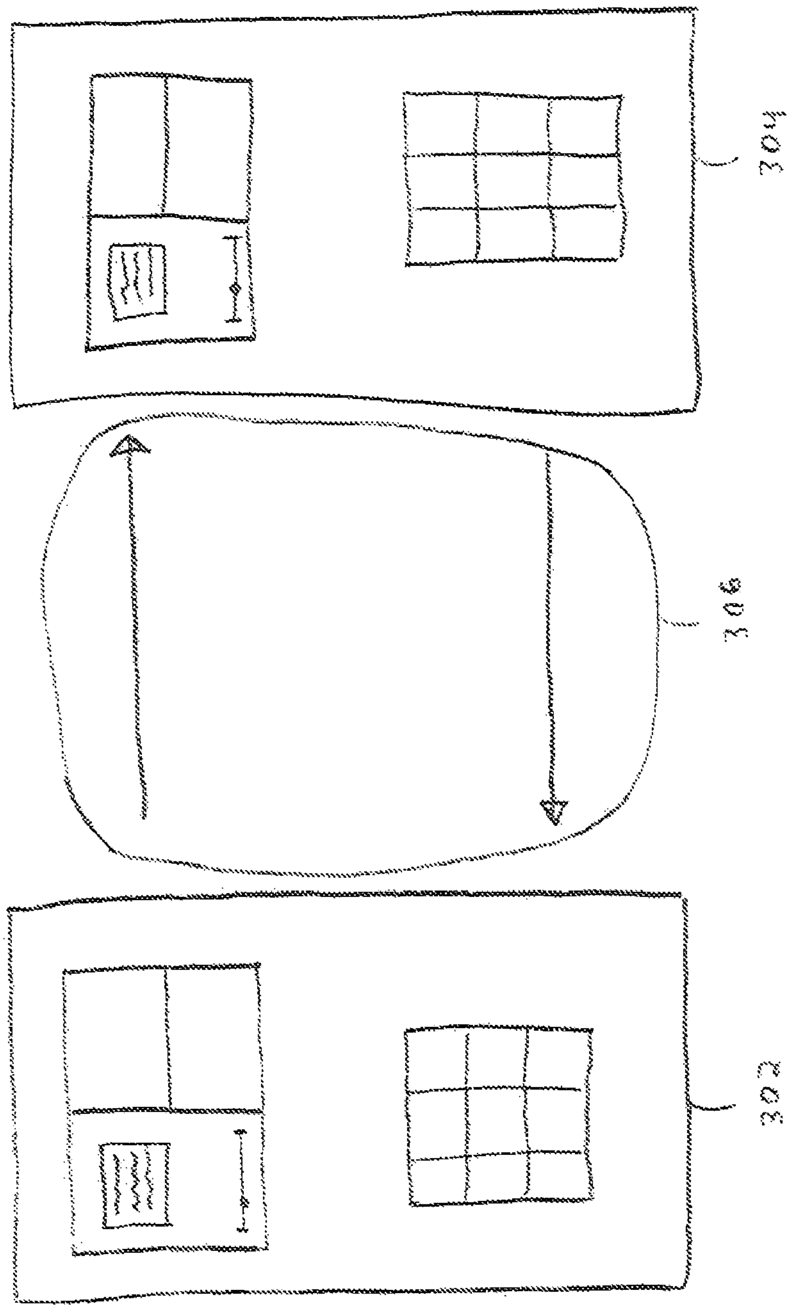
FIG. 3*a* is a block diagram illustrating two portable media devices connected over a direct communications link.

FIG. 3*a* is a block diagram illustrating two portable media devices 302 and 304 connected over a direct communications link. More particularly, FIG. 3*a* is a block diagram that illustrates a first portable media device 302 that is capable of communicating and exchanging digital content directly with a second portable media device 304 over a wired or a wireless direct communications link 306.

Each of the portable media devices 302 and 304 may include one or more devices capable of accessing content available from other portable media devices, or, more generally from other electronic devices. In addition, each of the portable media devices 302 and 304 may include a controller (not shown) that processes instructions received from or generated by a software application, a program, a piece of code, a device, a computer, a computer system, or a combination thereof, which independently or collectively direct operations of each of the portable media devices 302 and 304. The instructions may be embodied permanently or temporarily in any type of machine, component, equipment, storage medium, or propagated signal that is capable of being delivered to the portable media devices 302 and 304 or that may reside with each of the portable media devices 302 and 304. Each of the portable media devices may include a laptop computer, a mobile telephone, a personal digital assistant (PDA), a portable music player, such as, for example, a ZEN® portable media center, a portable media player, a portable messaging device, such as, for example, a Blackberry® or a Palm® Treo, a component, other equipment, or some combination of these items that is capable of responding to and executing instructions.

In one implementation, each of the portable media devices 302 and 304 may include one or more information retrieval software applications (e.g., a browser, a mail application, an instant messaging client, an Internet service provider client, or an AOL TV or other integrated client) capable of receiving one or more data units. The information retrieval applications may run on a general-purpose operating system and a hardware platform that includes a general-purpose processor and specialized hardware for graphics, communications and/or other capabilities. In another implementation, each of the portable media devices 302 and 304 may include a microbrowser application running on a reduced operating system with general purpose and specialized hardware capable of operating in mobile environments.

Furthermore, each of the portable media devices 302 and 304 may include one or more media applications. For example, each of the portable media devices may include a software application that enables each of the portable media devices 302 and 304 to receive and display an audio or video data stream. The media applications may include controls that enable a user to configure the user's media environment. For example, if the media application is receiving an Internet radio station, the media application may include controls that enable the user to select an Internet radio station, for example, through the use of "preset" icons indicating the station genre (e.g., country) or a favorite. In another example, the controls may enable the user to rewind or fast-forward a received media stream. For example, if a user does not care for a track on a particular station, the user may interface with a "next track" control that will queue up another track (e.g., another song).

The direct communications link 306 enables the two portable media devices 302 and 304 to communicate and exchange digital content without the use of an intermediary. For example, the two portable media devices 302 and 304 may employ a wireless local area network (LAN) or personal area network (PAN) such as, for example, Bluetooth or IEEE 802.11. Additionally or alternatively, the direct communications link 306 between the two portable media devices 302 and 304 may employ other forms of wireless communications technology and architectures including, for example, optical infrared communications technology and/or a wireless mesh network. In order for the two portable media devices 302 and 304 to communicate directly with one another over the direct communications link 306, the two portable media devices may need to be within a specified range of one another.

Portable media devices 302 and 304 may communicate with each other over direct communications link 306 in order to determine whether the portable media devices 302 and 304 each maintain supplemental content that is related to the same content selection. For example, first portable media device 302 may include supplemental content related to the Duran Duran album entitled "Seven and the Ragged Tiger." As such, first portable media device 302 may communicate with second portable media device 304 over direct communications link 306 to determine whether the second portable media device 304 has supplemental content related to the Duran Duran album "Seven and the Ragged Tiger." In the event that portable media device 304 has supplemental content related to the Duran Duran album "Seven and the Ragged Tiger," portable media devices 302 and 304 may exchange supplemental content related to "Seven and the Ragged Tiger."

Figure 3B:
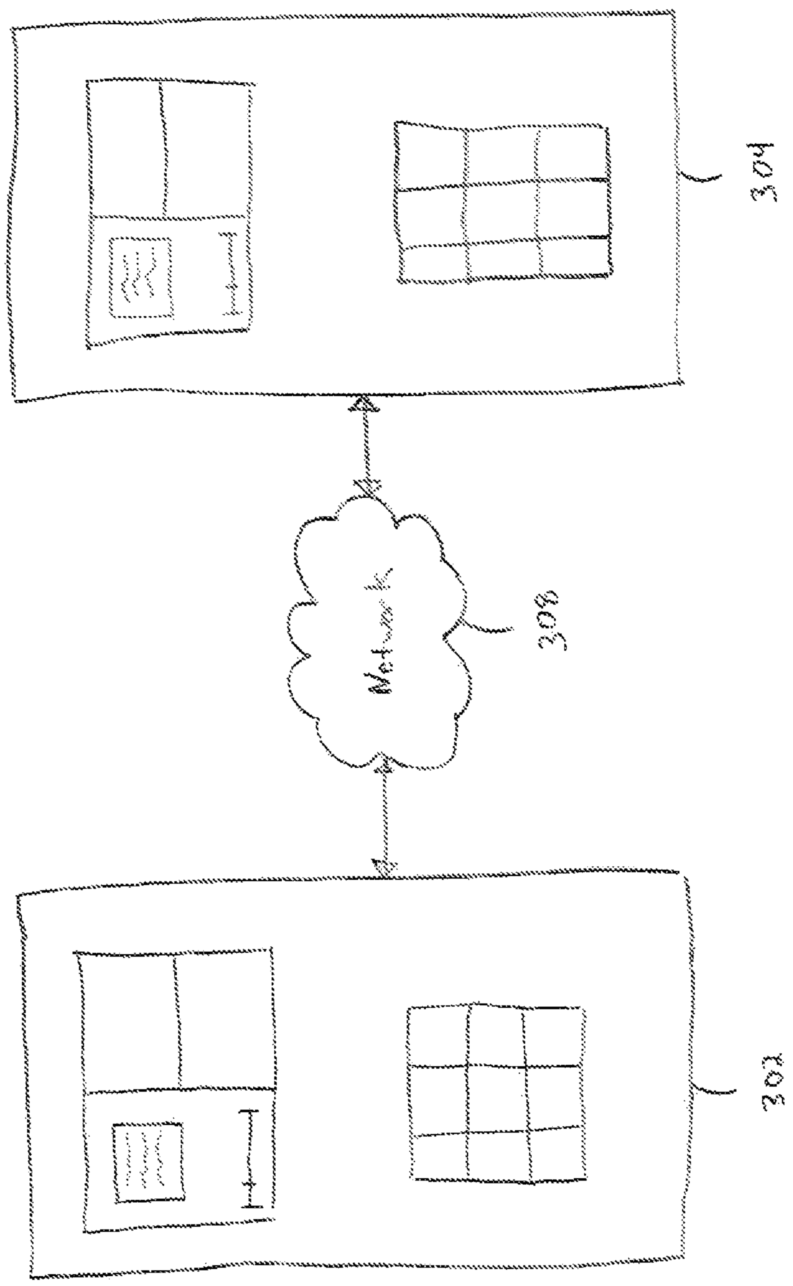
FIG. 3*b* is a block diagram of a communications system for exchanging digital content.

FIG. 3*b* is a block diagram of a communications system for exchanging digital content. More particularly, FIG. 3*b* illustrates two portable media devices 302 and 304 connected over a network 308 for exchanging digital content. The network 308 may include hardware and/or software capable of enabling direct or indirect communications between the portable media devices 302 and 304. As such, the network 308 may include a direct link between the portable media devices, or it may include one or more networks or subnetworks between the portable media devices 302 and 304. Each network or subnetwork may include, for example, a wired or wireless data pathway capable of carrying and receiving data. Examples of the delivery network include the Internet, the World Wide Web, a Wide Area Network (WAN), a LAN, analog or digital wired and wireless telephone networks, radio, television, cable, satellite, and/or any other delivery mechanism for carrying data. In addition, the network may exhibit a centralized architecture (e.g., hub and spoke) or, additionally or alternatively, the network may exhibit a decentralized architecture (e.g., a peer-to-peer or wireless mesh network). By utilizing network 308 to communicate with one another, portable media devices 302 and 304 may be able to communicate with one another across a greater distance than they would over a direct communications link. In addition, network 308 may allow each of the portable media devices 302 and 304 to communicate with one or more additional portable media devices (not shown) or one or more additional electronic devices (not shown) accessible via network 308 over a larger geographic area than may otherwise be possible. Furthermore, network 308 may enable each of the portable media devices 302 and 304 to access a host computer (e.g., server or server farm) that offers enhanced services.

Figure 4:
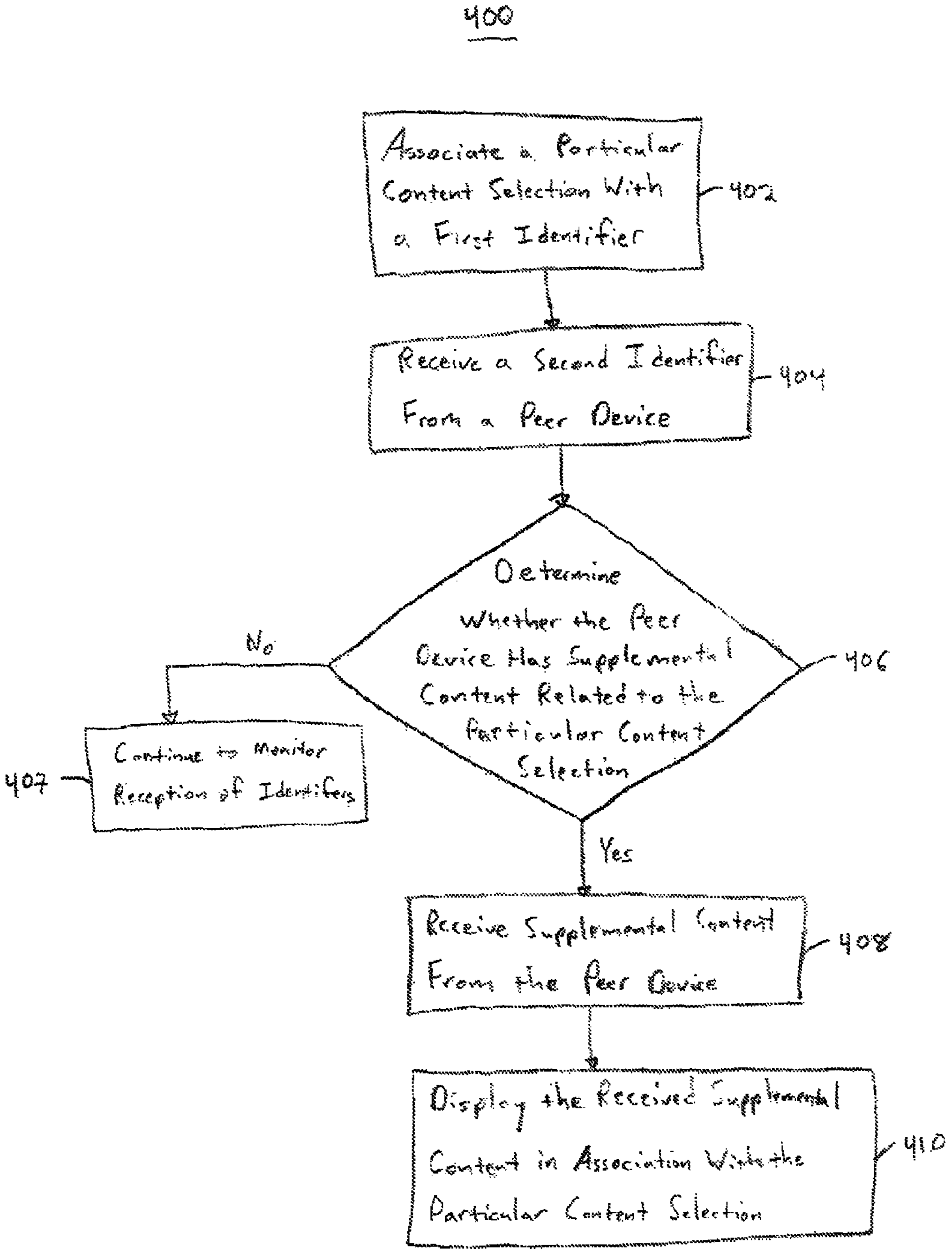
FIG. 4 is a flow chart of a process for exchanging digital content.

FIG. 4 is a flow chart 400 of an example of a process for exchanging supplemental content associated with a particular content selection between two portable media devices. The process begins by associating a particular content selection (e.g., a song, a music album, a video, a news story, a book, or a photograph) on a portable media device with a first identifier (402). The first identifier may include a metadata tag or other identifier that indicates an interest of a user of the portable media device in receiving supplemental content related to the particular content selection. Additionally or alternatively, the identifier may include a metadata tag or other identifier that indicates that the user of the portable media device has generated supplemental content related to the particular content selection. The identifier also may include an indication of a geographic location associated with the portable media device.

After associating the particular content selection with the first identifier, the portable media device receives a second identifier from a peer device (404). The second identifier may include a metadata tag or other identifier that indicates that the peer device has supplemental content related to a content selection. The identifier also may include an indication of a location associated with the peer device. The portable media device may receive the second identifier from the peer device in response to having broadcast a query looking to identify peer devices that have supplemental content related to the particular content selection. Alternatively, the portable media device may receive the second identifier without having actively solicited supplemental content related to the particular content selection.

The portable media device then determines whether the peer device has supplemental content related to the particular content selection based on the received second identifier (406). If the second identifier indicates that the peer device has supplemental content related to a content selection that is different than the particular content selection, the portable media device may determine that the peer device does not have supplemental content related to the particular content selection. Alternatively, if the second identifier indicates that the peer device has supplemental content related to the particular content selection, the portable media device determines that the peer device has supplemental content related to the particular content selection. In situations where the second identifier indicates that the peer device has supplemental content related to the particular content selection, the second identifier may be the same as or different than the first identifier.

If the portable media device determines that the peer device does not have supplemental content related to the particular content selection, the portable media device continues to monitor the reception of incoming identifiers (407). If the portable media device determines that the peer device has supplemental content related to the particular content selection, the portable media device receives the supplemental content from the peer device (408). For example, after determining that the peer device has supplemental content related to the particular content selection, the portable media device may transmit a request to the peer device requesting that the peer device send the supplemental content to the portable media device.

After receiving the supplemental content from the peer device, the portable media device displays the supplemental content in association with the particular content selection (410). In one example, the supplemental content received from the peer device may be related to a song or album on the portable media device. In such a situation, the portable media device may display the supplemental content from the peer device concurrently with playing the song or album. In another example, the supplemental content received from the peer device may be related to a news story on the portable media device. In such a situation, the portable media device may display the supplemental content from the peer device concurrently with displaying the news story. In some implementations, the portable media device may enable the supplemental content received from the peer device to be displayed without displaying the particular content selection concurrently.

FIG. **5*a* is a diagram 500 of a process for exchanging digital content. More particularly, the diagram 500 illustrates a process for exchanging supplemental content associated with a particular content selection between two portable media devices 502 and 504. The process begins when the first portable media device 502 transmits a request for supplemental content associated with a particular content selection stored on the first portable media device 502 (506). The first portable media device 502 may transmit the request to a particular portable media device (e.g., portable media device 504) or, more generally, the first portable media device 502 may transmit the request to any number of unidentified portable media devices. In some implementations, the first portable media device 502 may transmit the request in response to a user instruction. Additionally or alternatively, the first portable media device 502 may transmit the request automatically (i.e., without user instruction). For example, the first portable media device 502** may transmit the request for supplemental content associated with the particular content selection on a periodic basis. In some implementations, the request for supplemental content associated with the particular content selection may include a metadata tag or other identifier that indicates that the user of the first portable media device is interested in receiving supplemental content associated with the particular content selection or that indicates that the user has created supplemental content associated with the particular content selection.

The second portable media device 504 receives the request for supplemental content related to the particular content selection (508) and determines if the second portable media device 504 has supplemental content associated with the content selection (510). For example, in response to receiving the request for supplemental content related to the particular content selection, the second portable media device 504 may search the second portable media device for a metadata tag or other identifier indicating that a user of the second portable media device 504 has created supplemental content associated with the particular content selection.

If the second portable media device 504 determines that the second portable media device does not have supplemental content associated with the particular content selection, the second portable media device 504 continues to monitor incoming requests for supplemental content (511). If the second portable media device 504 determines that the second portable media device 504 has supplemental content associated with the particular content selection, the second portable media device 504 sends an acknowledgement to the first portable media device 502 indicating that the second portable media device has supplemental content associated with the particular content selection (512). In some implementations, the acknowledgement that the second portable media device 504 has supplemental content related to the particular content selection may include a metadata tag or other identifier that indicates that a user of the second portable media device 504 has created supplemental content associated with the particular content selection. In addition, the acknowledgement may include an indication of a geographic location of the second device.

The first portable media device receives the acknowledgement indicating the existence of supplemental content on the second portable media device 504 (514) and, in response, requests the supplemental content from the second portable media device 504 (516). The second portable media device 504 receives the request for the supplemental content on the second portable media device 504 from the first portable media device 502 (518) and, in response, transmits the supplemental content to the first portable media device 502 (520). The first portable media device 502 receives the supplemental content from the second portable media device 502 (522), and displays the received supplemental content (524).

In some implementations, the second identifier may include a metadata tag indicating a preference for a user of the second portable media device 504 related to the particular content selection. For example, a metadata tag may include an indication that the user of the second portable media device 504 favors, or, alternatively, disfavors, the particular content selection. Consequently, the first portable media device 502 may only request supplemental content related to the particular content selection from the second portable media device 504 if the second identifier includes information indicating that the user of the second portable media device 504 favors the particular content selection. Alternatively, the first portable media device 502 may only request supplemental content related to the particular content selection from the second portable media device 504 if the second identifier includes information indicating that the user of the second portable media device 504 disfavors the particular content selection.

As discussed above, in some implementations, the first portable media device 502 may broadcast the request for supplemental content associated with the particular content selection to an unlimited number of unspecified portable media devices. In such implementations, the first portable media device 502 may receive acknowledgements from multiple portable media devices that indicate that each of the multiple portable media devices have supplemental content related to the particular content selection. Therefore, the first portable media device 502 may enable the user of the first portable media device 502 to specify the particular portable media devices from which the first portable media device 502 should request supplemental content.

One criterion the user of the first portable media device 502 may use in selecting the portable media device from which to request supplemental content may be geographic location. For example, the user of the first portable media device 502 may instruct the first portable media device 502 only to request supplemental content from portable media devices in the same geographic location as the user of the first portable media device 502. In some implementations, a user of the first portable media device 502 may implicitly or explicitly limit or expand the range of the signal broadcast by the first portable media device 502 in order to narrow or broaden the boundaries of the geographic location within which other portable media devices are interrogated by the first portable media device 502. For example, the first portable media device 502 may be configured to be able to broadcast the signal at various different wavelengths and/or transmission powers and the user of the first portable media device 502 may select from among one or more different wavelengths and/or transmission powers in order to narrow or broaden the range of the broadcasted signal. Additionally or alternatively, the user of the first portable media device 502 may limit or expand the range of the signal broadcast by the first portable media device 502 by selecting different protocols over which to broadcast the signal. For instance, the first portable media device 502 may be configured to broadcast the signal over one or more of the Bluetooth communications protocol, the Wifi communications protocol, or the Wimax communications protocol, and the user of the first portable media device 502 may select from among the Bluetooth communications protocol, the Wifi communications protocol, or the Wimax communications protocol in order to narrow or broaden the range of the broadcasted signal. Furthermore, the user of the first portable media 502 device may be able to narrow or broaden the range of the signal broadcast by the first portable media device 502 by limiting or expanding the maximum number of network hops or ping latencies for the broadcasted signal.

Alternatively, the user of the first portable media device 502 may instruct the first portable media device 502 to request supplemental content from devices in a particular geographic location for which the user of the first portable media device 502 is interested in gauging public opinion related to the particular content selection. For example, the particular content selection may be a news story concerning politics, and the user of the first portable media device 502 may be interested in gauging the public opinion about the political news story from users from different geographic regions of the country or in particular regions of a city. Therefore, the user of the first portable media device 502 may first instruct the first portable media device 502 to only request supplemental content from portable media devices associated with a first geographic area such as, for example, the southern United States. Then, after sampling the public opinion related to the political news story in the first geographic area, the user of the first portable media device 502 may instruct the first portable media device 502 to only request supplemental content from portable media devices located in a second geographic area such as, for example, the northeastern United States.

In another example, in a city such as, for example, Washington, D.C., in which residents and visitors represent many different places of origin, the first portable media device 502 enables a user of the first portable media device 502 to gauge the public opinion regarding a particular content selection of people that are currently located in the city but that represent a different place or region of origin. For instance, if the user of the first portable media device 502 is interested in gauging the public opinion of New Yorkers in Washington, D.C. regarding a Washington Post article about the 2006 New York state senate race, the user of the first portable media device 502 may instruct the first portable media device 502 to only request supplemental content from portable media devices that are currently located in Washington, D.C. but that are associated with New York state.

As an extension of this concept, the portable media device may function as a device for collecting various metrics related to popular opinion. For example, as a user of the first portable media device 502 walks along a city block, the first portable media device 502 may interrogate all other portable media devices within a predetermined vicinity of the first portable media device 502 to determine which portable media devices have content related to a particular content selection stored on the portable media device such as, for example, a political news article. After identifying other portable media devices that have supplemental content related to the particular content selection, the first portable media device 502 may acquire the supplemental content from the identified portable media devices and analyze the acquired supplemental content in an effort to measure public opinion regarding the issues addressed in the particular content selection. For instance, the first portable media device 502 may measure public opinion regarding the issues addressed in the content selection by comparing the number of positive responses to the particular content selection with the number of negative responses to the particular content selection.

In some implementations, the first portable media device 502 may generate a public opinion poll regarding a particular content selection. For example, the first portable media device 502 may interrogate all other portable media devices within a predetermined vicinity of the first portable media device to determine which portable media devices have a particular content selection that is also stored on the first portable media device 502. After identifying other portable media devices that also have the particular content selection, the first portable media device 502 may send a query to the users of the identified portable media devices to determine the other users' opinions regarding the particular content selection. After receiving the query, the users of the other portable media devices may respond by sending supplemental content (e.g., an opinion or preference) regarding the particular content selection to the first portable media device 502.

In implementations in which the first portable media device 502 automatically transmits requests for supplemental content associated with the particular content selection to other portable media devices, the first portable media device 502 may employ logic to determine how to respond to acknowledgments received from other portable media devices that indicate that the other portable media devices have supplemental content related to the particular content selection.

For example, in some implementations, the first portable media device 502 may not automatically request supplemental content from every portable media device that acknowledges that it has supplemental content associated with the particular content selection. Rather, the first portable media device 502 may alert the user of the first portable media device 502 to the fact that the first portable media device 502 has discovered another portable media device that has supplemental content related to the particular content selection and prompt the user to determine whether the first portable media device 502 should request the supplemental content from the discovered portable media device.

In other implementations, the first portable media device 502 may determine how to respond to the discovery of one or more other portable media devices that have supplemental content related to the particular content selection based on the particular content selection itself or based on the availability and/or currency of supplemental content associated with the particular content selection. For example, for a particular content selection for which the user of the first portable media device 502 already has collected a relatively large amount of supplemental content from other portable media devices, the first portable media device 502 may not automatically request supplemental content in response to receiving an acknowledgment of the existence of supplemental content on a newly discovered portable media device. Similarly, for a particular content selection for which the user of the first portable media device 502 already has collected a relatively large amount of supplemental information from other portable media devices, the first portable media device 502 may not alert the user of the first portable media device 502 every time an acknowledgment of the existence of supplemental content is received from a newly discovered portable media device.

Alternatively, for a particular content selection for which the user of the first portable media device 502 has collected little or no supplemental content, and/or little or no recent supplemental content, from other portable media devices (e.g., a particular content selection related to a particularly obscure topic), the first portable media device 502 may automatically request supplemental content in response to receiving an acknowledgment of the existence of supplemental content on a newly discovered portable media device. Similarly, for a particular content selection for which the user of the first portable media device 502 has collected little or no supplemental content, and/or little or no recent supplemental content, from other portable media devices, the first portable media device 502 may alert the user of the first portable media device 502 every time an acknowledgment of the existence of supplemental content is received from a newly discovered portable media device.

In some implementations, the first portable media device 502 may determine that another portable media device has a content selection that the first portable media device 502 also has but for which the first portable media device 502 has relatively little or no supplemental content. However, the first portable media device 502 also may determine that the other portable media device also does not have supplemental content related to the content selection. In such instances, the first portable media device 502 may initiate a query to a user of the other portable media device requesting that the user create and send supplemental content related to the content selection to the first portable media device 502. In some implementations, the first portable media device 502 may send an electronic form to the other portable media device querying a user of the other portable device for the user's opinion of the content selection. For example, if the content selection is a news article regarding the saying of the Pledge of Allegiance in schools, the form may ask "As a result of reading this article, are you now in favor of or against requiring children to recite the Pledge of Allegiance in school?"

Figure 5A:
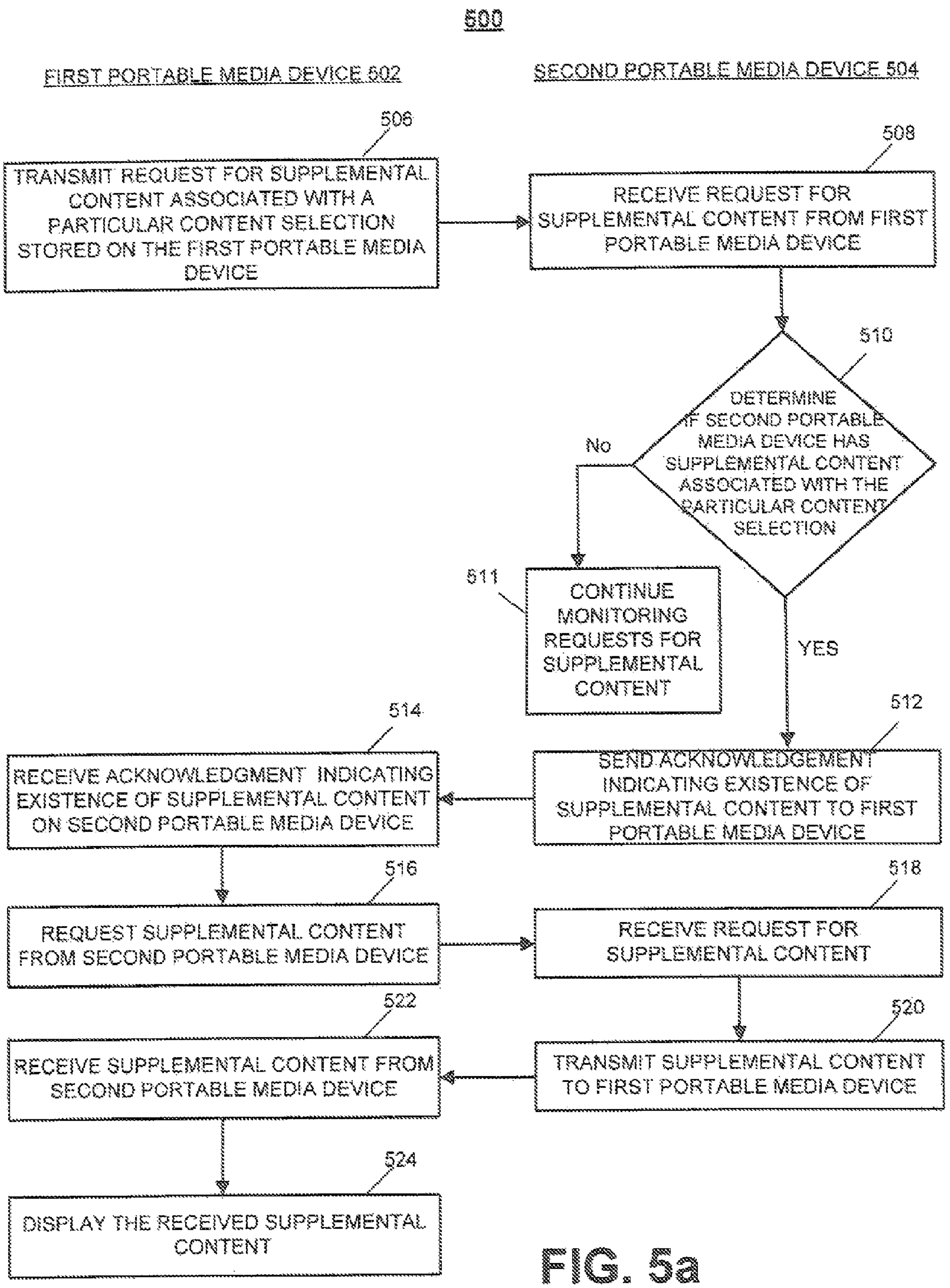
FIGS. 5*a* and 5*b* are diagrams of processes for exchanging digital content.
Figure 5B:
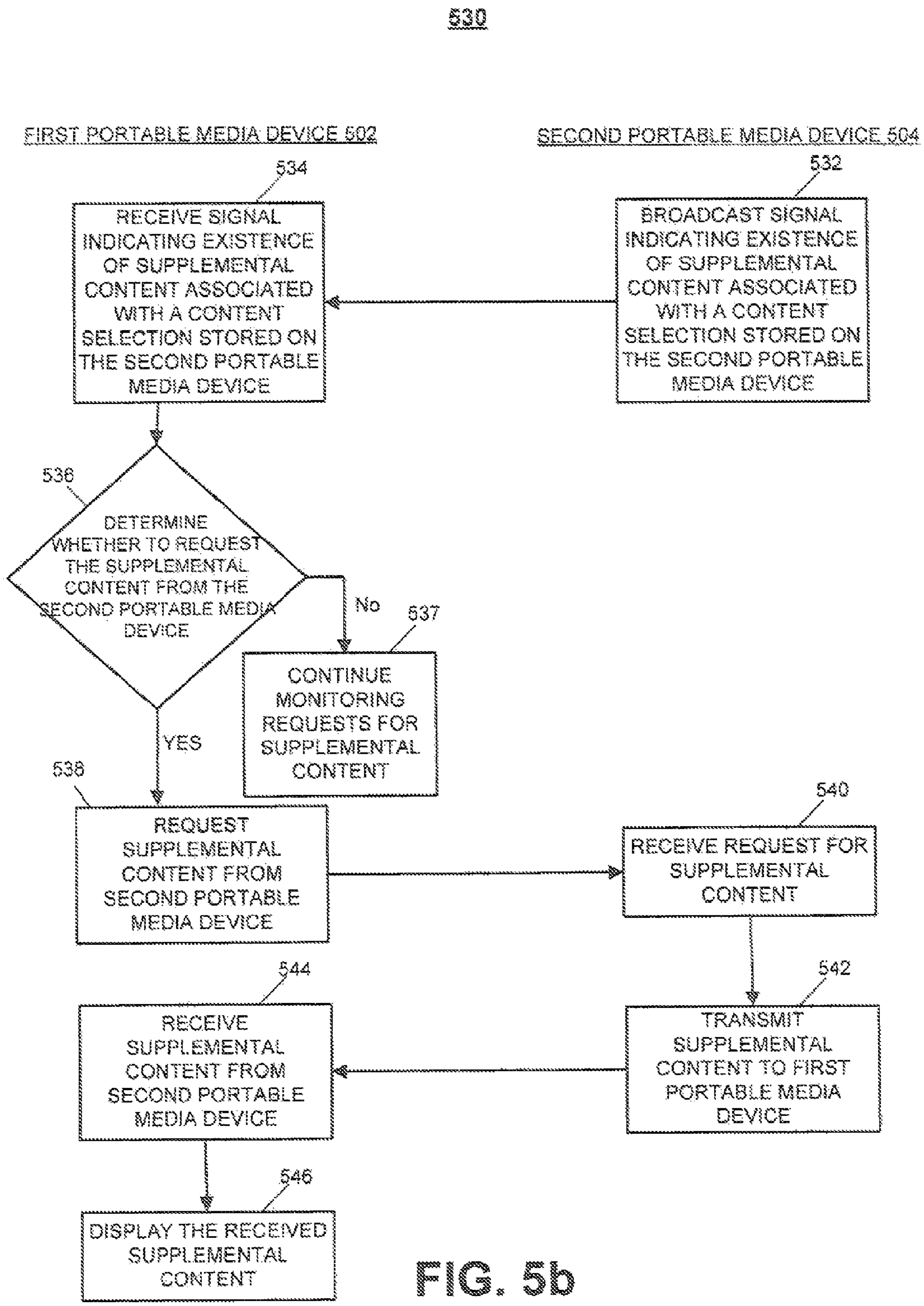

FIG. 5*b* is a diagram 530 of another process for exchanging digital content. More particularly, diagram 530 illustrates a process for exchanging supplemental content associated with a particular content selection between two portable media devices 502 and 504. The process illustrated in FIG. 5*a* generally involves the first portable media device 502 actively requesting supplemental content related to a particular content selection. In contrast, in the process illustrated in FIG. 5*b*, the first portable media device 502 is not actively requesting supplemental content related to a particular content selection. Rather, in the process illustrated in FIG. 5*b*, the first portable media device 502 requests supplemental content from the second portable media device 504 in response to receiving a signal indicating the existence of supplemental content related to a particular content selection that is broadcast by the second portable media device 504.

The process is initiated when the second portable media device 504 broadcasts a signal indicating the existence of supplemental content associated with a particular content selection that is stored on the second portable media device 504 (532). In some implementations, the signal indicating the existence of supplemental content associated with the particular content selection may include a metadata tag or other identifier indicating that the user of the second portable media device has created supplemental content associated with the particular content selection.

The first portable media device 502 receives the signal indicating the existence of supplemental content associated with the content selection on the second portable media device (534) and determines whether to request the supplemental content from the second portable media device 504 (538). For example, the first portable media device 502 may search the first portable media device 502 for a metadata tag or other identifier indicating that the user of the first portable device 502 is interested in supplemental content associated with the content selection. Additionally or alternatively, the first portable media device 502 may search the first portable media device 502 for a metadata tag or other identifier indicating that the user of the first portable media device 502 has created supplemental content associated with the content selection.

If the first portable media device 502 determines not to request the supplemental content from the second portable media device 504, the first portable media device 502 continues monitoring incoming requests for supplemental content (537). If the first portable media device 502 determines to request the supplemental content from the second portable media device 504, the first portable media device 502 transmits a request for the supplemental content to the second portable media device 504 (538). The second portable media device 504 receives the request for the supplemental content from the first portable media device 502 (540) and, in response, transmits the supplemental content to the first portable media device 502 (542). The first portable media device 502 receives the supplemental content from the second portable media device 504 (544) and displays the received supplemental content (546).

The described systems, methods, and techniques may be implemented in digital electronic circuitry, computer hardware, firmware, software, or in combinations of these elements. Apparatuses embodying these techniques may include appropriate input and output devices, a computer processor, and a computer program product tangibly embodied in a machine-readable storage device for execution by a programmable processor.

A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed application-specific integrated circuits (ASICs).

Various modifications may be made. For example, useful results still may be achieved if steps of the disclosed techniques are performed in a different order and/or if components in the disclosed systems are combined in a different manner and/or replaced or supplemented by other components.

Furthermore, two portable media deices are not limited to exchanging supplemental content related to a particular content selection. Rather, two portable media devices may exchange supplemental content related to a particular subject matter. For example, a first portable media device may maintain supplemental content related to a newspaper article chronicling France's reaction to its loss to Italy in the 2006 World Cup final. A second portable media device may maintain supplemental content related to a newspaper article chronicling Italy's reaction to its victory over France in the 2006 World Cup final. In such a situation, the supplemental content selection on the first portable media device is related to a different content selection than the supplemental content selection on the second portable media device. Nevertheless, the two supplemental content entries are related to the same general subject matter (e.g., soccer and/or the 2006 World Cup). Therefore, the two portable media devices may recognize the common subject matter shared by the two supplemental content entries and consequently facilitate the exchange of the two supplemental content entries.

Moreover, while the systems, methods, and techniques described above generally have been described in the context of exchanging supplemental content between two or more portable media devices, the systems, methods, and techniques discussed above also could be applied to electronic devices that are not traditionally thought of as portable media devices such as, for example, general purpose computers including, for example, desktop computers. Furthermore, even when supplemental content selections are exchanged between two or more portable media devices, the particular content selections to which the exchanged supplemental content selections are related need not be stored on portable media devices. Rather, the particular content selections to which the exchanged supplemental content selections are related may be stored on one or more alternative devices (or not stored at all) and the portable media devices merely may include tags that identify the supplemental content selections as being related to, or otherwise associated with, the particular content selections. For example, in some implementations, the particular content selections may be stored on a network host computer that is accessible by one or more of the portable media devices while the supplemental content selections are stored on the portable media devices. Accordingly, other implementations are within the scope of the following claims.

What is claimed is:

1. A method of exchanging information, the method comprising:

maintaining a news article on a portable media device;

receiving, at the portable media device, a communication from a peer device;

determining if the peer device has supplemental content related to the news article based on the received communication, wherein the supplemental content includes a description of user reaction to the news article, and wherein the supplemental content is associated with the news article but remains separate and distinct from the news article that is maintained on the portable media device;

based on a determination that the peer device has supplemental content related to the news article, receiving the supplemental content from the peer device; and enabling a user to perceive the received supplemental content.

2. The method of claim 1 wherein receiving, at the portable media device, a communication from a peer device comprises receiving, at the portable media device, one or more tags from the peer device, the one or more tags received from the peer device including a first indication indicating that the peer device has the supplemental content related to the news article and a second indication indicating a location associated with the peer device, the method further comprising:

storing, at the portable media device, the received supplemental content; and associating the stored supplemental content with a third indication indicating the location associated with the peer device.

3. A method of exchanging information, the method comprising:

associating a first tag with a particular content selection from among a group of content selections;

receiving a second tag from a peer device;

comparing the first tag and the second tag;

determining whether the peer device has supplemental content related to the particular content selection based on the received second tag, wherein the supplemental content includes a description of user reaction to the news article, and wherein the supplemental content is associated with the news article but remains separate and distinct from the news article that is maintained on the portable media device;

receiving the supplemental content from the peer device based on a determination that the peer device has supplemental content related to the particular content selection; and enabling a user to perceive the received supplemental content in association with the particular content selection.

4. The method of claim 3 wherein the first tag includes an indication that identifies the particular content selection.

5. The method of claim 3 wherein the second tag includes an indication that the peer device has supplemental content related to the particular content selection.

6. The method of claim 5 further comprising:

receiving a third tag from the peer device, the third tag including an indication of a location associated with the peer device; and determining whether the location associated with the peer device is within a predetermined distance from a device of the user, wherein receiving the supplemental content from the peer device is based on determining that the location associated with the peer device is within the predetermined distance from the device of the user in addition to determining that the peer device has supplemental content related to the particular content selection.

7. The method of claim 3 further comprising transmitting the first tag to the peer device, wherein receiving the second tag from the peer device comprises receiving the second tag from the peer device in response to transmitting the first tag to the peer device.

8. The method of claim 3 wherein:

receiving the second tag comprises receiving the second tag over a wireless connection, and receiving the supplemental content comprises receiving the supplemental content over a wireless connection.

9. The method of claim 3 wherein associating the first tag with the particular content selection from among the group of content selections comprises associating the first tag with the particular content selection from among the group of content selections including one or more of an image file, a video file, an audio file, a text file, a web page, or an electronic document.

10. The method of claim 3 wherein receiving the supplemental content comprises receiving a rating of the particular content selection, an indication of a preference for the particular content selection, or a discussion of the particular content selection.

11. The method of claim 3 wherein receiving the second tag from the peer device comprises receiving the second tag from a portable media device, a personal digital assistant, a portable computer, a mobile telephone, or a digital media player.

12. The method of claim 3 further comprising transmitting additional supplemental content to the peer device in response to receiving the second tag from the peer device.

13. The method of claim 3 further comprising interrogating the peer device to determine whether the peer device has supplemental content related to the particular content selection, wherein receiving the second tag comprises receiving the second identifier in response to interrogating the peer device.

14. The method of claim 3 wherein determining whether the peer device has supplemental content related to the particular content selection based on the received second tag further comprises:

comparing the received second tag to the first tag, and determining that the first tag and the received second tag correspond to the same content selection based on the comparison of the received second tag to the first tag.

15. The method of claim 3 wherein receiving the supplemental content from the peer device comprises requesting the supplemental content from the peer device and receiving the supplemental content in response to the request.

16. The method of claim 3 wherein receiving the supplemental content from the peer device comprises receiving a weblog entry from the peer device.

17. The method of claim 3 wherein receiving the supplemental content from the peer device based on a determination that the peer device has supplemental content related to the particular content selection comprises:

informing the user that the peer device has supplemental content related to the particular content selection; and receiving an instruction as input from the user to acquire the supplemental content related to the particular content selection from the peer device.

18. A method of exchanging information, the method comprising:

associating a first content selection stored on a portable media device with a first tag;

accessing a second tag that is made available by a peer device, wherein the second tag is associated with a second content selection and indicates that supplemental content related to the second content selection is stored on the peer device;

comparing the first tag to the second tag;

identifying a commonality shared by the first content selection and the second content selection based on a comparison of the first tag to the second tag; and initiating an exchange of the supplemental content from the peer device to the portable media device based on the identified commonality shared by the first content selection and the second content selection, wherein the supplemental content includes a description of user reaction to the news article, and wherein the supplemental content is associated with the news article but remains separate and distinct from the news article that is maintained on the portable media device.

19. A method of exchanging information, the method comprising:

maintaining a digital item on a portable media device;

receiving, at the portable media device, a communication from a peer device;

determining if the peer device has supplemental content related to the digital item based on the received communication, wherein the supplemental content comprises a rating of the digital item, an indication of a preference for the digital item, or a discussion of the digital item;

based on a determination that the peer device has supplemental content related to the digital item, receiving the supplemental content from the peer device, wherein receiving the supplemental content comprises receiving the rating of the digital item, the indication of the preference for the digital item, or the discussion of the digital item; and enabling a user to perceive the received supplemental content.

* * * * *